W. J. BERGENS.
COMPOUND VALVE.
APPLICATION FILED JULY 15, 1911.

1,051,539.

Patented Jan. 28, 1913.
2 SHEETS—SHEET 1.

Witnesses.
William Scheibel
C. N. Whitfield

Inventor
William J. Bergens
by Bonnhardt Co.
Attys

W. J. BERGENS.
COMPOUND VALVE.
APPLICATION FILED JULY 15, 1911.
1,051,539.
Patented Jan. 28, 1913.
2 SHEETS—SHEET 2.
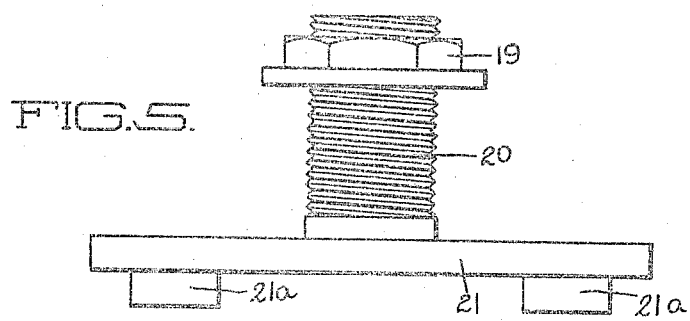
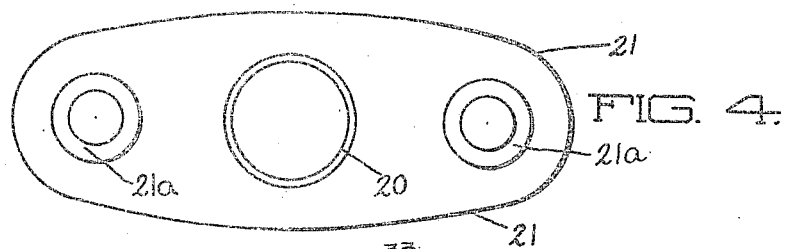
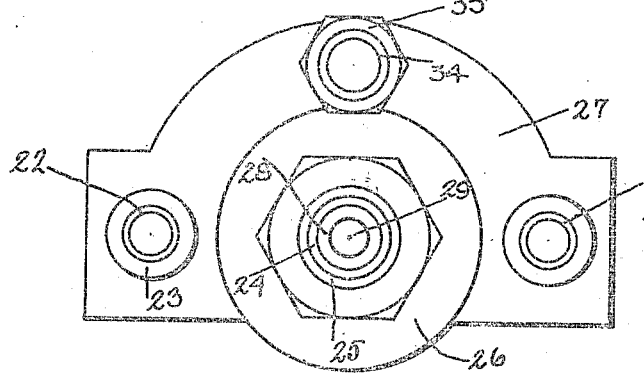
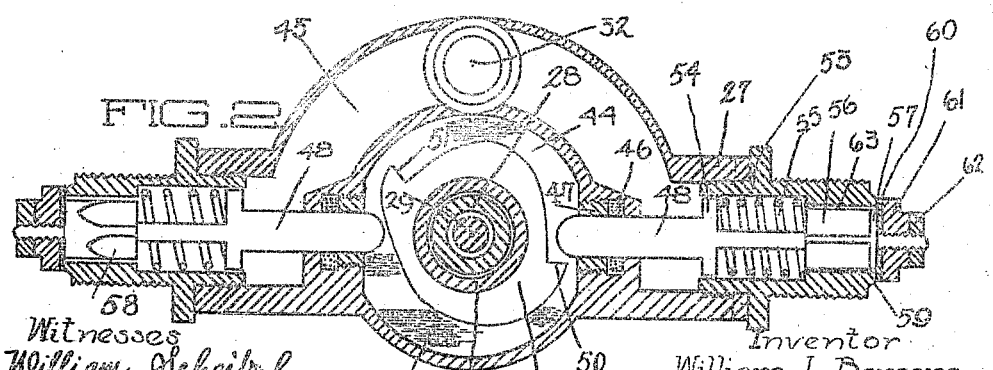
Witnesses
William Schaibel.
C. N. Whitfield.
Inventor
William J. Bergens
by Bonnerhardt Co.
Attys

UNITED STATES PATENT OFFICE.

WILLIAM J. BERGENS, OF CLEVELAND, OHIO, ASSIGNOR OF ONE-FOURTH TO CARLETON L. TERRY AND ONE-FOURTH TO JOHN A. BOMMHARDT, OF CLEVELAND, OHIO.

COMPOUND VALVE.

1,051,539.  Specification of Letters Patent.  Patented Jan. 28, 1913.

Application filed July 15, 1911. Serial No. 638,769.

*To all whom it may concern:*

Be it known that I, WILLIAM J. BERGENS, citizen of the United States, residing at Cleveland, in the county of Cuyahoga and State of Ohio, have invented certain new and useful Improvements in Compound Valves, of which the following is a specification.

This invention relates to compound valves, and has for its object to provide an improved valve so constructed that both hot and cold water may be drawn through one outlet by the operation of one handle only. This type of valve is especially useful in connection with lavatories, bath tubs, sinks and the like, and the device makes a very desirable fixture, as the manipulation by only one hand is necessary to draw either hot or cold water or to combine the two to any desired temperature, the liquid in any case being discharged from the same spout.

A further object of the invention is to provide improved means for lubricating the valve operating devices, the lubricant chamber being separate from the water passages so that the oil is not mixed with or affected by the water.

A further object of the invention is to provide an arrangement by which the operating cam can be set to correspond to the hot and cold water pipes in either position thereof. It is usual to place the hot water supply pipe at the left side and the cold water pipe at the right, but this arrangement is sometimes reversed, and when it is, the valve herein described may be reversed so that the pipes do not have to be crossed.

Various other objects and advantages will be apparent from the following description and the accompanying drawings.

Figure 6:
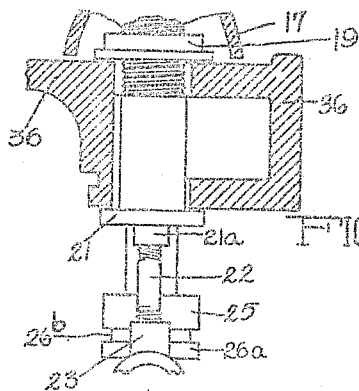
Figure 1:
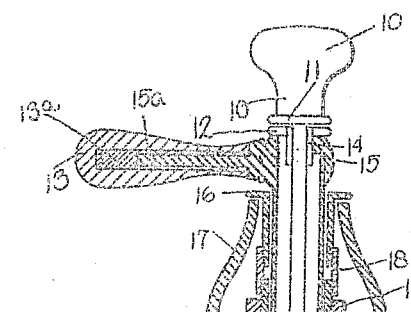

In the drawings—Figure 1 is a vertical section of the valve and part of a lavatory to which it is applied. Fig. 2 is a section on the line A—A of Fig. 1. Fig. 3 is a plan of the top of the valve casing. Fig. 4 is a plan of a yoke forming part of the fixture, and Fig. 5 is a side elevation of the yoke. Fig. 6 is a detail in section showing the devices for connecting the valve to the lavatory body or slab.

Referring specifically to the drawings, 10 represents a waste lift handle, fitted to a metal socket 11, and 12 is a ferrule to fasten the handle and hold the same in fixed position on the waste rod 29.

13 is a handle, and 14 is a groove in the hollow or tubular valve stem 24, to receive the socket 15 of the handle.

16 is a ferrule connected by a screw coupling 18 to the upper end of a sleeve 20 which is fastened to the lavatory slab by a nut 19, the ferrule holding in place an escutcheon 17 on top of the slab. The sleeve 20 extends through a suitable hole in the slab and is integral with a yoke 21 which fits against the underside of the slab and is held rigidly in position by means of the nut 19. On the underside of the yoke are two bosses 21ª provided with female threads engaging nipples 22 the lower ends of which screw into bosses 23 of the valve body 27 whereby the valve body is suspended from the yoke in rigid and fixed position. The nipples have right and left threads so that adjustment may be obtained and the valve set level even although the lavatory is warped or out of plumb.

The tubular valve stem 24 extends through the sleeve 20 and into the valve body and at its lower end carries a cam socket piece 52, forming a connection between the handle and the cam whereby the latter may be turned.

28 is an inner tube or sleeve at the axis of the valve body which extends upwardly into the outer sleeve 20, and also projects below the body of the valve, and acts as a guide for the hollow operating stem 24 to revolve on, and also as a dam or confining wall for the oil indicated at 43 in the cam chamber 44, which will be filled with oil at least to the height permitted by the top of the tube 28. The bottom extension 30 of the tube is threaded to receive a coupling 31 for the waste pipe 31ª.

25 is a recessed nut which screws on the nipple 26ᵇ of the valve casing, and holds packing 25ª, and 26ª is a nut on the bonnet 26 of the valve casing.

32 is an outlet extension pipe on the valve body 27, extending at an angle to the body of the valve and preferably integral with same, and coupled by a nut 33 with packing 33ª to a slip tube 34.

38 is a coupling nut, 38ª indicates packing, and 39 a lock nut, and 39ª a fiber washer, said lock nut 39ª being drawn up tight against the washer causing flange 42 of a ferrule 40 to fit tight against the web 41 of the slab, the slip tube 34 extending from coupling 38 through the ferrule 40 into the spigot 37 formed in the ware 36.

The chamber 44 in the valve body is located at the center thereof, and is separated from the water passages 45 by a wall, the chamber being filled with oil as above stated, and the passages 45 lead to the oulet 32. The valve stems 48 are located at opposite sides of the body or central chamber and work through packing 46 and glands 47 in said wall so that said chamber is water and oil tight. The cam 49, or rather its extension sleeve 52 is mounted on the lower end of the tubular stem 24 as above described. The cam has stops 50 and 51 which strike the valve stems to prevent reverse throw of the cam, and preferably the cam is so constructed that it will open the cold water valve first. Thus in Fig. 2 the hot water valve is shown at the left and the cold water valve at the right, and the cam is spaced from the latter so that the cold water valve is opened before the cam begins to operate on the hot water valve.

The inlet valves are somewhat similar in construction, and a description of one will apply to both. Each valve barrel is indicated at 53, and this serves as a coupling between the main valve casing and the inlet pipe which will be attached thereto. A spring 55 is confined in the barrel and presses against the valve. This spring is simply to take up the tension, since the valve tends to close under pressure. The part 56 acts as a guide for the valve, and on its various sides the hot water valve has recesses 58 of different lengths, forming graduated inlet ports to prevent hot water being turned on too suddenly.

57 is a flange on the valve and 59 is the valve seat at the end of the barrel 53. The disk or washer 60 which closes against the seat is fastened by a washer 61 and a lock nut 62.

In the operation of the valve the cam is inserted in the central chamber either right or left according to the manner in which the hot and cold water pipes are set, so as to always have the cam act on the cold water valve first. By turning the handle in the proper direction clockwise in Fig. 2 the cam is turned and forces the valve stems 48 outwardly, the cold water valve first and the hot water valve next, lifting the disks 60 from the valve seats 59 and opening the valves, allowing the water to flow through the passages 45 where it is mixed and passes through the outlet 32 to the spigot 37. By turning the cam more or less the proportion of hot water relative to the cold water is varied and consequently the temperature of the water may be varied as desired. By turning the cam far enough the stem of the cold water valve will pass over the rise of the cam and hot water only will be delivered. When the high parts of the cam are in line with the two stems both hot and cold water are turned on.

As above explained, the chamber 44 is filled with oil to the height permitted by the inner sleeve 28, and the packing 46 prevents water entering this chamber and consequently the oil remains indefinitely to lubricate the cam and the valve stem so that the valve will not rust or clog and will always work easily. The entire separation of the water passages and the oil chamber is an important advantage.

As stated, the cam 49 is reversible. As shown in Fig. 2 it will open the right hand or cold water valve first. If the supply pipes are found reversed, the cam can be inserted in reverse position or turned half way around, so as to open the left hand valve first. This is important and is not conveniently possible with any other fitting known to me, and is permitted by the fact that the stops 50 and 51 are integral with the cam, so that they will operate in either position.

Having thus described my invention, what I claim as new and desire to secure by Letters Patent is:—

1. A compound valve comprising a casing having a plurality of inlets and a central chamber and also having an outlet and passages connecting said outlet with the inlets, valves at the inlets having stems extending through the wall of said chamber, a cam located in the chamber and bearing against the valve stems, a tube extending through the chamber and around which the cam turns, and a sleeve connected to the cam and extending around said tube and provided with an operating handle.

2. A compound valve comprising a casing having a plurality of inlets and an outlet communicating therewith, valves in said inlets and located in diametrically opposite positions and a cam located in the casing between the valve stems, to operate the same, said cam being reversible, to operate either valve first, and having projecting stops which operate in either position of the cam to limit the throw thereof.

3. A compound valve comprising a casing having a plurality of inlets and an outlet communicating therewith, valves in said inlets and located in diametrically opposite positions and a reversible cam located in the casing between the valve stems, to operate the same, and means reversible with the cam to control the travel thereof.

4. A valve comprising a casing having a lubricant chamber and a water passage therein, a valve element controlling said passage and having a stem extending into said chamber, an operating device in said chamber adapted to operate on the stem to open the valve, a tube extending upwardly from said chamber and adapted to confine the lubricant, and a sleeve connected to the operating device and surrounding said tube and provided with a handle.

5. A valve comprising a casing having a fluid passage therein, an oil chamber separated from said passage and provided with a tube extending above the body of the valve to form a dam to inclose the oil, a valve element controlling said passage, and an operating device extending around the tube and into the chamber and adapted to act on the valve element, to open the valve.

6. The combination in a mixing valve of a lubricating chamber, a sleeve rising from the chamber, and a valve stem surrounding the sleeve and forming with it a confining chamber for the lubricant.

In testimony whereof, I affix my signature in presence of two witnesses.

WILLIAM J. BERGENS.

Witnesses:
JOHN A. BOMMHARDT,
J. B. DAVIS.